July 22, 1958  W. G. PFANN  2,844,688
ELECTROMAGNETIC SWITCHING
Filed Nov. 23, 1956  2 Sheets-Sheet 1

INVENTOR
W. G. PFANN
BY John C. Morris
ATTORNEY

July 22, 1958 W. G. PFANN 2,844,688
ELECTROMAGNETIC SWITCHING
Filed Nov. 23, 1956 2 Sheets-Sheet 2

INVENTOR
W. G. PFANN
BY John C. Morin
ATTORNEY

United States Patent Office 2,844,688
Patented July 22, 1958

2,844,688

ELECTROMAGNETIC SWITCHING

William G. Pfann, Far Hills, N. J., assignor to Bell Telephone Laboratories, Incorporated, New York, N. Y., a corporation of New York Application November 23, 1956, Serial No. 624,018

3 Claims. (Cl. 200—112)

This invention relates to circuit controlling devices, and more particularly to electric switches in which the switching operation is dependent upon the action of a magnetic field on a nonmagnetic member.

An object of the present invention is a new and improved electric switch comprising a magnetically movable nonmagnetic conductive member.

Another object of this invention is an improved circuit controlling device.

In a specific illustrative embodiment of one aspect of this invention there is provided a cylinder or switch housing of insulating material having a pair of spaced conductors extending through each end wall thereof. A movable nonmagnetic conductive member, advantageously a mercury globule, is positioned within the housing and in contact with portions of one conductor pair to complete an electrical path therebetween. A source of potential is connected to the mercury-completed circuit so as to cause it to carry a current in a preassigned direction. There is also provided a magnet structure which establishes magnetic flux lines at an angle to the preassigned current direction, the current and its associated magnetic field interacting with the magnetic field set up by the magnet structure to exert a force on the movable mercury member.

The value of the current and the strength of the field of the magnet structure are selected so that the force resulting therefrom is sufficient to move the mercury member from one pair of conductors to the other conductor pair. In illustrative embodiments of this invention, a mercury globule can be thereby moved rapidly over considerable distances without breaking up.

It is, therefore, a feature of this invention that a movable nonmagnetic current carrying member in a circuit controlling device is moved by the combined effect of the current through the member and a magnetic field established thereabout by a magnetic flux-producing member.

A more complete understanding of the invention and of the various features thereof may be gained from consideration of the following detailed description and the accompanying drawing in which.

Figure 1A:
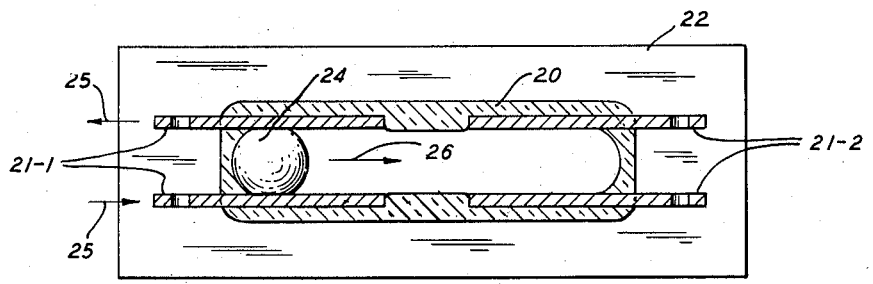
Figs. 1A and 1B are, respectively, a plan view in section and an elevation view of a switch illustrative of one aspect of the present invention.
Figure 1B:
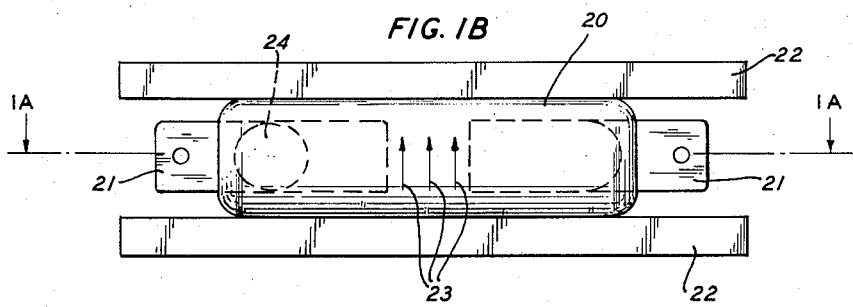

Referring now to the drawing, Figs. 1A and 1B show a switch structure illustratively embodying the basic concepts of this invention. A housing 20 is there shown having a pair of conductors 21 sealed in and extending through each end thereof. A magnetic flux-producing member 22, only one-half of which is shown in Fig. 1A, establishes flux in the direction indicated by the arrows 23 of Fig. 1B. A globule of mercury 24 is shown positioned between and in contact with the left-hand conductor pair 21–1. A source of potential, not shown, is connected across the pair 21–1 so as to cause a current to flow in the direction indicated by the arrows 25 of Fig. 1A. The current carrying mercury member 24 has a force exerted on it in the direction indicated by the arrow 26 of Fig. 1A for the above assumed directions of current flow and magnetic flux. The magnitude of the force acting on the globule is proportional to the product of the current, the strength of the magnetic field, and the sine of the angle between the directions of the field and the current.

The magnetic field intensity and the value of the current through the mercury member are chosen so that their combined effect can move the mercury mass from its rest position between the conductors 21–1 to a position between the pair of conductors 21–2 at the opposite end of the switch housing 20.

This switch can be operated, i. e., the mercury globule moved from between the conductors 21, by controlling the value of the current, or the strength of the magnetic field, or the angle between the field and current directions, or any combination of these variables.

While the housing 20 may be made of glass or a molded plastic, any insulating material is suitable for its manufacture; advantageously, however, an insulating material that is not wetted by the material of the globule should be employed. Additionally, a housing of the type described in fuller detail hereinbelow in connection with Figs. 4A and 4B may be used.

Either a permanent magnet or an electromagnet may be used as the magnetic flux-producing member of this invention. If an electromagnet is used, it might advantageously be wound in series with the conductors 21–1, being arranged to set up a magnetic field in the direction of the arrows 23 of Fig. 1B.

The portions of the conductors 21 sealed within the housing 20 may advantageously be made of molybdenum or tungsten strip. In some embodiments of the invention it may be desirable to provide conductors or electrodes having a graphitized surface, or it may be desirable to provide electrodes made entirely of graphite.

The switch structure above-described may be modified so as not to have the switched mercury globule touch the contacts of the circuit which it is desired to complete. The switched globule can be arranged to move an insulating member, for example, a thin, flexible rubber membrane, the insulating member then moving a second mercury globule into a circuit-completing position.

If neither accurate horizontal positioning nor holding power across pair 21–2 is provided, the mercury member of Figs. 1A and 1B may not, in being switched from pair 21–1 to the pair 21–2, come to rest between and in contact with the conductors 21–2. Accordingly, Figs. 2A and 2B show a switch illustrative of this invention and so constructed that a mercury member 30 therein is stable in the switched position without the necessity of holding power or accurate positioning.

Figure 2A:
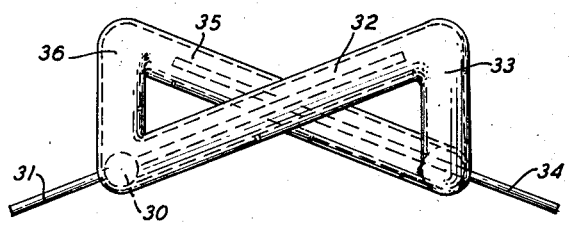
Figs. 2A and 2B are elevation and side views, respectively, of an embodiment of an aspect of the present invention.
Figure 2B:

Applying a proper potential across a conductor pair 31 of Fig. 2A and establishing a proper magnetic field thereabout causes the globule 30 to move up an inclined housing portion 32 and down a portion 33 into contact with a second conductor pair 34. Similarly, the movable member 30 can then be moved up an inclined portion 35, down a portion 36 and into contact with the conductor pair 31. A suitable magnet structure has not been shown in Figs. 2A and 2B in the interest of clarity of illustration, it being understood that such a structure is necessary to the proper operation of the device therein shown.

Other switches having housings designed to insure that the movable member will not rebound from a housing wall and return to the powering pair of conductors, and also designed to insure that the globule will not come to rest in an intermediate position, out of contact with either conductor pair, can be readily devised.

A switch constructed in accordance with the principles of this invention and having, for example, a constricted housing portion between the conductor pairs, or a curved switch housing, can provide excellent position stability.

Furthermore, it may be advantageous in some illustrative embodiments of this invention to decelerate the switched mercury member and to bring it to rest before it reaches the housing end toward which it is accelerated; this would, of course, serve to prevent its rebounding therefrom. In this connection, a charged capacitor can be arranged across a conductor pair so that the switched member, in moving into contact with that conductor pair, completes an electrical circuit to the charged capacitor, the capacitor current direction and a suitable magnetic structure being arranged to exert a braking or decelerating force on the switched member.

Also, a circuit including a charged capacitor can be used in combination with illustrative embodiments of the present invention to switch or accelerate a movable nonmagnetic conductive member from the pair to which the circuit is connected to an opposite conductor pair. An advantage of such an arrangement is that arc-free switching can be achieved by insuring that the capacitor discharge pulse dies out before the movable member leaves the accelerating conductors. Additionally, capacitor storage makes available large switching currents in circuits ordinarily carrying relatively small currents.

Figure 3:
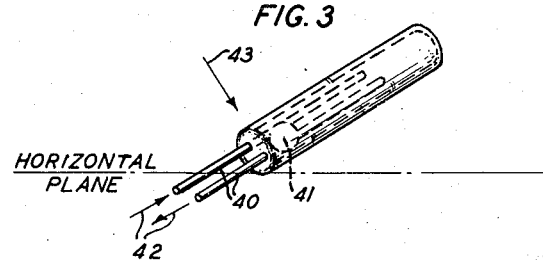
Fig. 3 is a perspective view of another aspect of this invention.

Fig. 3 shows an illustrative embodiment of the present invention which is arranged to function as an interrupter. Applying a potential across a pair 40 causes a current flow through a mercury member 41 in the direction indicated by arrows 42. This current in combination with a magnetic flux-producing member, not shown, which establishes flux in the direction of arrow 43, causes the mercury globule 41 to jump, thus stopping the current flow in the pair 40. When the force of gravity returns the member 41 to a position in contact with the pair 40, current flows again and the globule 41 once again jumps.

The interrupter of Fig. 3 may, of course, be provided with a pair of conductors extending through the upper end wall of the housing. Powering the lower pair of such an arrangement causes the movable member to jump to the upper pair of conductors. If the upper pair is connected to a properly poled source of potential, the switched member will be held between the upper pair until the holding current is interrupted. If the upper pair is not powered, or improperly powered, the member will return to a position between the lower conductors.

Figure 4A:
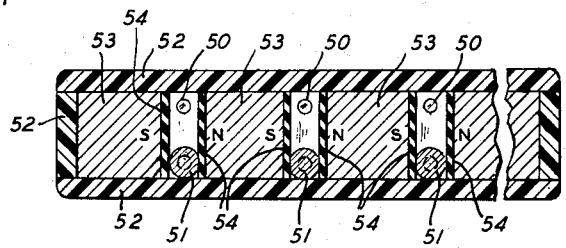
Figs. 4A and 4B are, respectively, a plan view in section and an elevation view of a portion of another illustrative embodiment of an aspect of the principles of this invention.
Figure 4B:
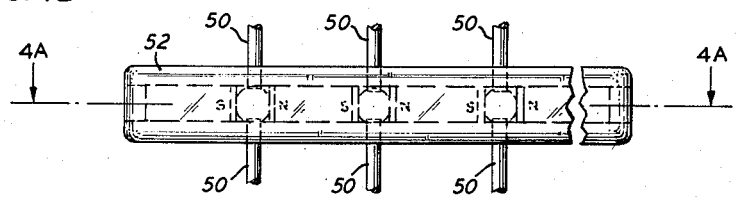

Figs. 4A and 4B show a device embodying aspects of the basic concepts of this invention and containing a plurality of switching elements or mercury globules. Electrodes or conductors 50 are positioned to extend perpendicularly to the direction of travel of the mercury globules 51. The structural members 52 of Figs. 4A and 4B may be made of glass or plastic or any other suitable insulating material. A plurality of magnet members 53 are also used as structural members in the novel assembly shown. In some embodiments it may be desirable to provide the sides of the magnets which face the switching passages with strips of insulation 54 in order to obtain isolation among the circuits connected to the electrodes 50. Advantageously, the magnet members 53 may be made of a suitable ferrite material which, being a good electrical insulator and having good magnetic properties, would provide circuit isolation without the use of the insulation strips 54.

There is no reason to limit the number of contact or electrode pairs in a switch unit of the present invention to two. Switch structures can be provided having three or more electrode pairs and a properly oriented magnetic field extending over the entire switch assembly.

Establishing the proper direction of current flow in a contact pair of a multi-electrode pair unit can cause the globule therebetween to advance to a second pair. If the second pair is properly powered, the globule will advance or step to the third pair, etc. The globule can be returned to its initial position by the force of gravity, by stepping it backwards, or by arranging the contact pairs in a circular array. If a circular array design is employed, the globule in such an arrangement could be operated or moved along by swinging a single magnet around the circular structure. Furthermore, the design of Figs. 2A and 2B, for example, could be incorporated into a multi-pair structure to obtain good position stability.

Figure 5A:
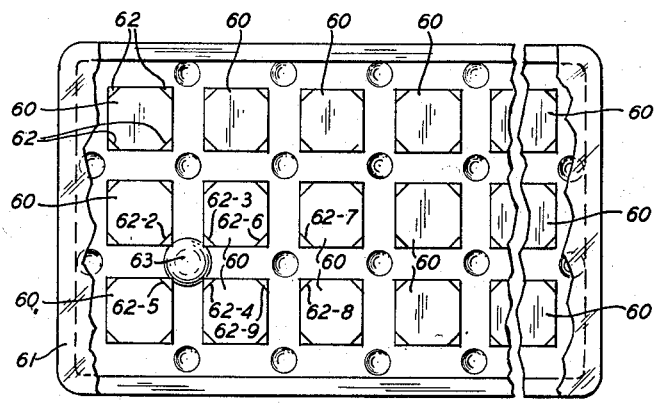
Figs. 5A and 5B are plan and elevation views, respectively, of a portion of a switch assembly illustratively embodying the basic concepts of this invention, a part of the housing thereof being broken away to show the assembly details clearly.
Figure 5B:
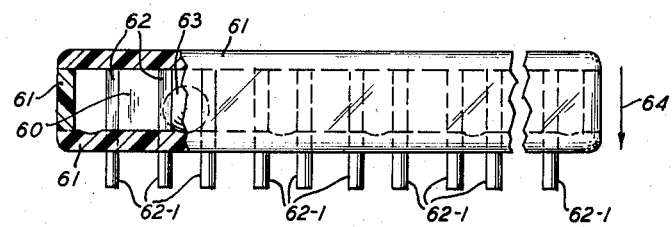

Figs. 5A and 5B show an illustrative embodiment of the present invention. The grid switch therein shown comprises a plurality of spaced insulating blocks 60 mounted within a housing 61 of insulating material and defining therewith a plurality of intersecting channels. At the corners of each block 60 are electroconductive pins 62 which extend through the bottom of the housing 61 to provide pin portions 62-1 to which to secure electrical conductors. A conductive globule 63 is shown in a rest position in contact with four pins. The globule is stabilized in each rest or intersection position by a depression at the center of each channel intersection. A magnetic field is established through the housing 61 in the direction indicated by an arrow 64 in Fig. 5B.

If a potential source is applied between the pins designated 62-3 and 62-4, the globule will be moved toward the right of Figs. 5A and 5B to a new rest position in contact with pins 62-6, 62-7, 62-8 and 62-9. This direction of movement occurs if pin 62-3 is made positive with respect to pin 62-4 and if the magnetic field direction is as above assumed.

In a similar manner, the globule 63 may then be moved up or down, or right or left, from its new rest position to still another stable location. It is noted that the globule 63 is pulled along, rather than pushed, so as to maintain contact with its powering electrodes long enough for it to be moved out of an intersection depression.

Further illustrative embodiments of the principles of this invention might, for example, use an alternating switching current. Other embodiments might use a switching passage or track formed by the annular space between two cylindrical electrodes, a magnetic field being established normal to the plane of travel of a movable member therein, and one or more contact elements being arranged in the annular space so as to be in position to be contacted by the movable member.

Figure 6:
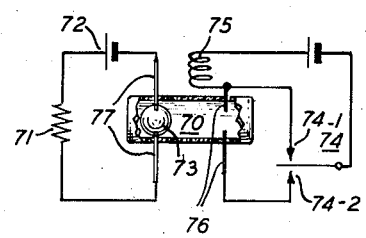
Fig. 6 shows a circuit having a switch of the type shown in Figs. 1A and 1B for example, as a component thereof.

Furthermore, switches made in accordance with aspects of this invention are well suited for use in a great variety of circuits. Fig. 6 shows an "on-off" circuit arrangement, comprising a schematically represented switch 70, wherein the load current is used as the switching current for the "off" portion of the switching cycle. As there shown, a load resistor 71, a battery 72 and a mercury globule 73 form a load current path. When a key 74 is moved to its upper contact 74–1, the magnetic field set up by a coil 75 is sufficient in strength and proper in direction to interact with the load current through the globule 73 to cause it to move out of the load circuit and into contact with the right-hand terminals 76 of the switch 70. Moving the key to its lower contact 74–2 establishes a current through and a magnetic field about the globule 73 so as to switch it back to the left-hand contacts 77, thereby again completing a circuit through the load resistor 71.

It is to be understood that the above-described arrangements are but illustrative of the application of the principles of this invention. Numerous other arrangements may be devised by those skilled in the art without departing from the spirit and scope of the present invention.

What is claimed is:

1. A switching device comprising insulating base plate means having mounted thereon a plurality of spaced rectangular blocks arranged so as to define a number of intersecting channels, each of said blocks including electroconductive corner portions, said corner portions extending through said plate means to provide terminal portions therebeyond, a depression in said plate means at each channel intersection, non-magnetic electroconductive movable globule means disposed in one of said depressions in contact with the block corners adjacent thereto, potential means for connection to selected contacted terminal portions for thereby causing an electric current to flow through said movable means in a given direction, and magnetic means for establishing flux lines about said globule at an angle to said given direction, whereby said globule means may be selectively moved from one to another of said depressions.

2. In combination, an insulating housing having therein a plurality of rectangular blocks defining intersecting channels, said blocks having electro-conductive corner portions, non-magnetic electroconductive movable globule means in contact with the corner portions bordering a first channel intersection, means including the corner portions at said first intersection for sending a flow of current through said globule means in a given direction, and magnetic means for establishing lines of flux about said globule at an angle to said given direction, whereby said globule means may be selectively moved along said channels.

3. A grid switch comprising a base plate having a plurality of electroconductive pin elements extending therethrough, said elements being arranged in groups and defining a number of intersecting switching paths, each group having a base plate depression associated therewith, movable non-magnetic electroconductive globule means positioned in a first of said depressions in contacting relationship with each element of the group associated with said first depression, means connected to said contacted group for sending an electric current through said globule in a given direction, and means for establishing magnetic lines of flux about said globule at an angle to said given direction, whereby said globule may be selectively moved along said switching paths.

References Cited in the file of this patent

UNITED STATES PATENTS

| | | |
|---|---|---|
| 1,773,036 | Fitzgerald | Aug. 12, 1930 |
| 2,158,009 | Hufnagel | May 9, 1939 |
| 2,440,028 | Swisher et al. | Apr. 20, 1948 |
| 2,522,721 | Mattern | Sept. 19, 1950 |